United States Patent Office 3,395,734
Patented Aug. 6, 1968

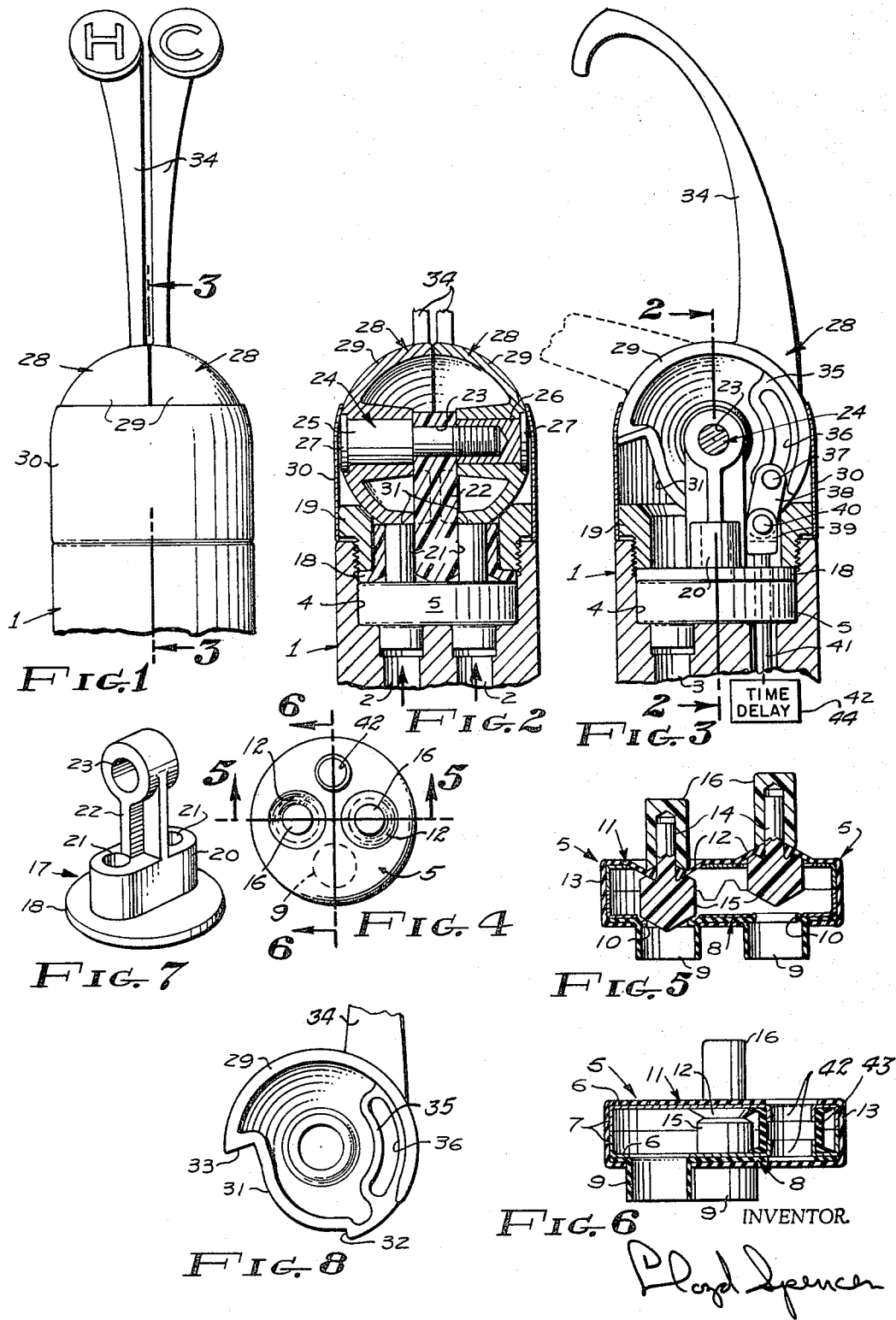

3,395,734
DUAL HANDLE MIXING VALVE
Lloyd Spencer, 220 Patrician Way,
Pasadena, Calif. 91105
Filed Oct. 14, 1965, Ser. No. 496,050
5 Claims. (Cl. 137—637)

This invention relates to dual handle mixing valves. Included in the objects of this invention are:

First, to provide a dual handle mixing valve which is so arranged that hot and cold water valve handle levers are disposed side by side in such a manner that they may be moved singly, in unison, or in opposition by one hand.

Second, to provide a dual handle mixing valve wherein the relative positions occupied by the hot and cold water valve handle levers give a visual indication of the relative flow of water through their respective valve ports.

Third, to provide a dual handle mixing valve which incorporates a novel automatic shutoff means so arranged that after either or both the hot or cold water valve units have been manually opened to any selected position or readjusted to any other position, and a predetermined time has elapsed, the shutoff means moves either or both the valve units, which may be open, to their closed positions.

Fourth, to provide a dual handle mixing valve which incorporates a valve cartridge of the type shown in my copending application, Ser. No. 491,771, filed Sept. 30, 1965, for Replaceable Valve Unit.

With the above and other objects in view as may appear hereinafter, reference is directed to the accompanying drawings, in which:

FIGURE 1 is a fragmentary front view of the dual handle mixing valve.

FIGURE 2 is a longitudinal sectional view thereof, taken through 2—2 of FIGURE 3.

FIGURE 3 is another longitudinal sectional view thereof, taken through 3—3 of FIGURE 1.

FIGURE 4 is a plan view of the valve cartridge.

FIGURE 5 is an enlarged sectional view of the valve cartridge taken through 5—5 of FIGURE 4.

FIGURE 6 is another enlarged sectional view of the valve cartridge taken through 6—6 of FIGURE 4.

FIGURE 7 is a perspective view of the cartridge holder and handle support.

FIGURE 8 is a fragmentary side view of one of the handle members.

The mixing valve includes a valve body 1 which may vary depending upon the type of installation desired. For purposes of illustration, the valve body is indicated as cylindrical, with a pair of diametrically disposed inlet bores 2 and a laterally offset outlet bore 3. The three bores intersect a cylindrical recess 4 which receives a valve cartridge 5 in the form of a shallow cylinder.

The cartridge is the type shown in the aforementioned application and comprises a pair of disks 6 spaced by abutting rims 7. The inner disk is provided with three openings aligning with the bores 2 and 3, whereas the outer disk is provided with two openings aligning with the bores 2.

The inner disk is covered by a valve membrane 8 having three sleeves 9 fitting the bores 2 and 3. Within the sleeves fitting the bores 2, the valve membrane is provided with axially displaceable valve seats 10. The outer disk is covered by a diaphragm membrane 11 having a pair of axially displaceable diaphragms 12 overlying the apertures in the outer disk. The membrane 11 is provided with a marginal rim 13 covering the sides of the disks 6 and terminating in a lip underlying the margin of the membrane 8.

The diaphragms 12 have central apertures which receive pins 14. The pins extend from valve heads 15 disposed between the disks 6 and engageable with the valve seats 10. The pins fit within valve stems 16 which cooperate with the valve heads to clamp the diaphragms 12.

The cartridge 5 is sealingly held in place by a cartridge holder and handle support 17. The holder includes a retainer disk 18, the margin of which is engaged by a retainer ring 19 which screw-threads into the outer end of the valve body 1. The holder is provided with a boss 20 having a pair of bores 21 which align with the inlet bores 2 and receive the stems 16. The holder 17 is also provided with a central post 22 terminating in a crossbore 23.

The crossbore 23 receives a journal 24 comprising a bolt 25 and nut 26 forming cylindrical journal surfaces and terminating in retainer flanges 27. The journal 24 receives a pair of handle units 28 having confronting and complementary semispherical hubs 29 provided with inwardly directed bearings fitting the journal surfaces. A sleeve 30 covers the ends of the journal 24.

A portion of each hub overlies a corresponding valve stem 16 and is provided with a spiral cam surface 31 terminating in shoulders 32 and 33. The outer ends of the stems 16 form cam followers. The shoulders 32 and 33 engage the outer ends of the stems 16 to limit movement of the handle units 28. Handle arms 34 extend outwardly from the hubs 29. The hubs 29 are in contiguous relation, except for their confronting portions which pass on opposite sides of the post 22.

Operation of the dual handle mixing valve is as follows:

Forward movement of either handle arm 33 opens a corresponding valve head 15 with respect to its valve seat 10. The extent of forward movement is indicative of the extent to which the valve is open. The valve handles may be adjusted individually to obtain the desired temperature of water; then both may be closed simultaneously with a single movement.

In many installations, such as in hotels and other public places, it is desirable that the mixing valve shut off after a predetermined period. For this purpose, the hubs 29 are provided with confronting bosses 35 located at the back side of the hubs with respect to the post 22. The bosses are provided with arcuate channels 36 coextensive with the cam surfaces 31. A pin 37 projects into both channels 36 and is supported between the channels by a link bar 38. The link bar is connected to a clevis 39 by a pin 40. The clevis 39 is provided at one end of a draw rod 41. The draw rod 41 extends through the valve cartridge 5. In order to accommodate the draw rod 41, the disks 6 of the cartridge 5 are provided with confronting apertures 42 bordered by lips which are encompassed by a sealing sleeve 43. The draw rod is connected to a time delay 44, one form of which may be a solenoid controlled by a time-delay switch. Regardless of the positions of the handle arms 34, a pull on the rod 41 will shut off both valves.

Having fully described my invention, it is to be understood that I do not wish to be limited to the details herein set forth, but my invention is of the full scope of the appended claims.

I claim:

1. A dual handle mixing valve, comprising:
 (a) a valve body including a pair of contiguous parallel inlet bores and an outlet common to said inlet bores;
 (b) valve means for controlling flow from said inlet bores to said outlet bore, including a pair of cam followers;
 (c) a pair of contiguous cam disks having a common axis of rotation, confronting arcuate slots, and arcuate cam faces engageable with said cam followers;

(d) means for journalling said cam disks within the limits of said cam faces;
(e) a pair of handles for said cam disks disposed in contiguous relation for simultaneous and alternative manual engagement;
(f) a cross pin fitting said arcuate slots and arcuately movable on movement of either of said cam disks to open a valve unit; and
(g) link means extending from said cross pin and operable to draw either or both of said cam disks to its valve unit closing position.

2. A dual handle mixing valve, comprising:
(a) a pair of contiguous, parallel valve units having axially movable operating elements;
(b) a pair of arcuately movably contiguous actuators having a common axis traversing the axes of said operating elements and operable on arcuate movement to effect opening and closing of said valve units, the confronting sides of said actuators having confronting arcuate slots;
(c) means for journalling said actuators;
(d) a pair of contiguous handle levers extending from said actuators for simultaneous and alternative manual engagement;
(e) a cross pin disposed in said slots and movable by arcuate displacement of either of said actuators in a direction to effect opening of its corresponding valve unit; and
(f) link means extending from said cross pin and operable to cause said cross pin to draw either of said actuators in a direction to effect closing of its corresponding valve unit.

3. A dual handle mixing valve comprising:
(a) a valve body having a valve cartridge recess in its outer end, a pair of inlet bores and an outlet bore communicating therewith;
(b) a valve cartridge sealingly mounted in said recess and including a pair of valve units for controlling flow from said inlet bores to said outlet bore, said valve units having cam followers disposed in parallel axes and projecting outwardly from said valve body;
(c) a pair of contiguous and confronting actuators including cam surfaces engaged by said cam followers;
(d) means for journalling said actuators about a common axis traversing the axes of movement of said cam followers; and
(e) contiguous handle levers extending from said actuators for simultaneous manual engagement.

4. A dual handle mixing valve, comprising:
(a) a valve body including a pair of contiguous parallel inlet bores and an outlet common to said inlet bores;
(b) a pair of valve means for controlling flow from said inlet bores to said outlet bore, each including a cam follower at one end for actuating said valve means;
(c) a pair of contiguous and confronting actuators including cam surfaces engaged by said cam followers;
(d) means for journalling said cam disks within the limits of said cam faces; and
(e) a pair of handlts for said cam disks disposed in contiguous relation for simultaneous and alternative manual engagement.

5. A dual handle mixing valve, comprising:
(a) a pair of contiguous, parallel valve units having axially movable operating elements;
(b) a pair of arcuately movable contiguous and confronting actuators having a common axis traversing the axes of said operating elements and operable on arcuate movement to effect opening and closing of said valve units, said actuators having confronting arcuate slots;
(c) means for journalling said actuators;
(d) a pair of contiguous handle levers extending from said actuators for simultaneous and alternative manual engagement;
(e) a cross pin disposed in said slots and movable by arcuate displacement of either of said actuators in a direction to effect opening of its corresponding valve unit; and
(f) link means extending from said cross pin and operable to cause said cross pin to draw either or both of said actuators in a direction to effect closing of their respective valve units.

References Cited

UNITED STATES PATENTS

| | | | |
|---|---|---|---|
| 2,529,852 | 11/1950 | Snowden | 137—637 |
| 2,574,624 | 11/1951 | Cochin | 137—637 |
| 2,602,630 | 7/1952 | Petschke | 137—606 X |
| 2,607,202 | 8/1952 | Garland | 137—606 X |
| 3,275,036 | 9/1966 | Spencer | 137—636.1 |

CLARENCE R. GORDON, *Primary Examiner.*